United States Patent
Stein et al.

(10) Patent No.: US 6,187,447 B1
(45) Date of Patent: Feb. 13, 2001

(54) CONDENSATION CURABLE SILICONE FOUL RELEASE COATINGS AND ARTICLES COATED THEREWITH

(75) Inventors: Judith Stein; Timothy Brydon Burnell, both of Schenectady; James Anthony Cella, Clifton Park, all of NY (US)

(73) Assignee: General Electric Company, Schenectady, NY (US)

(*) Notice: Under 35 U.S.C. 154(b), the term of this patent shall be extended for 0 days.

(21) Appl. No.: 09/575,745

(22) Filed: May 22, 2000

Related U.S. Application Data

(62) Division of application No. 09/094,975, filed on Jun. 15, 1998, now Pat. No. 6,107,381.

(51) Int. Cl.$^7$ ....................................... B32B 9/04
(52) U.S. Cl. .................. 428/447; 428/450; 428/452; 114/361; 106/18.12
(58) Field of Search ................... 106/15.05, 18.12, 106/287.12, 287.13, 287.14, 287.16; 114/361; 428/447, 450; 524/261, 265, 267, 268, 588, 731, 859, 860, 863; 528/14, 17, 18, 33, 34, 901

(56) References Cited

U.S. PATENT DOCUMENTS

| | | | |
|---|---|---|---|
| 4,552,919 | 11/1985 | Mikami et al. | 524/860 |
| 4,910,252 | 3/1990 | Yonehara et al. | 524/730 |
| 5,013,800 | 5/1991 | Inoue | 525/477 |
| 5,218,059 | 6/1993 | Kishihara et al. | 525/477 |
| 5,331,074 | 7/1994 | Slater et al. | 528/14 |
| 5,681,914 | 10/1997 | Kobayashi et al. | 528/18 |

FOREIGN PATENT DOCUMENTS

| | | |
|---|---|---|
| 759457A2 | 8/1996 | (EP) . |
| 759457A3 | 8/1996 | (EP) . |

*Primary Examiner*—D. S. Nakarani
(74) *Attorney, Agent, or Firm*—Bernadette M. Bennett; Donald S. Ingraham

(57) ABSTRACT

Anti-fouling coatings comprise a room temperature vulcanizable polyorganosiloxane composition and a polyorganosiloxane free from silanol groups and comprising at least one hydroxy- or alkoxy-terminated polyoxyalkylenealkyl radical. The latter is capable of blooming to the surface of the cured room temperature vulcanizable composition, thus inhibiting the deposition of marine life on the coated article.

6 Claims, No Drawings

CONDENSATION CURABLE SILICONE FOUL RELEASE COATINGS AND ARTICLES COATED THEREWITH

CROSS-REFERENCE TO RELATED APPLICATIONS

This application is a division of application Ser. No. 09/094,975 entitled "Condensation Curable Silicone Foul Release Coatings and Articles Coated Therewith," filed on Jun. 15, 1998 now U.S. Pat. No. 6,107,381 which is incorporated herein by reference.

This invention was made with government support under Contract No. N61533-93-C-0062 awarded by the Department of the Navy and Contract No. N00014-96-C-0145 awarded by DARPA. The government has certain rights in this invention.

BACKGROUND OF THE INVENTION

This invention relates to foul release coatings and articles coated therewith.

As poetically stated in U.S. Pat. No. 4,861,670, "Marine fouling due to pernicious and pestiferous sessile organisms is a problem which reaches from ancient times to the present." In more simple terms, a perennial major aggravation to shippers and users of marine equipment in contact with water is the tendency of such equipment to become encrusted with varieties of wildlife, as illustrated by barnacles and zebra mussels.

Said patent goes on to describe in considerable detail the types of treatments that have been employed, starting as early as 1854, to minimize marine fouling. Treatment materials have included compounds of such metals as copper, tin, arsenic, mercury, zinc, lead, antimony, silver and iron, as well as toxic organic materials such as strychnine and atropine. With increasing interest in the state of the environment, the use of such materials has been strongly discouraged.

More recently, polyorganosiloxanes (hereinafter sometimes designated "silicones" for brevity) have been found useful as anti-fouling coatings. They include condensation cured room temperature vulcanizable (hereinafter sometimes "RTV") compositions comprising silica as a filler in combination with silanol- or trialkoxy-terminated silicones, catalysts and crosslinking agents. They may be made sprayable by dilution with solvents, typically volatile organic compounds such as hydrocarbons.

There is still a need, however, to improve various properties of RTV-based foul release coatings, particularly their release efficiency and their effective lifetime.

SUMMARY OF THE INVENTION

The present invention is based on the discovery that addition of specifically defined water-insoluble silicones to a conventional RTV formulation improves foul release properties. It includes foul release coatings having said improved properties and articles coated therewith.

In one of its aspects, the invention is directed to condensation curable coating compositions comprising the following and any reaction products thereof:

(A) a one- or two-part room temperature vulcanizable polyorganosiloxane composition, and (B) a marine foul release-enhancing proportion of at least one polyorganosiloxane free from silanol groups and comprising about 10–60% by weight of at least one hydroxy- or alkoxy-terminated polyoxyalkylenealkyl radical, component B being capable of blooming to the surface of the cured product of component A.

Another aspect of the invention is articles comprising a marine structure coated with an anti-fouling coating which is the condensation cured reaction product of the composition defined hereinabove.

DETAILED DESCRIPTION; PREFERRED EMBODIMENTS

The word "component" is frequently employed herein for brevity to designate the materials present in the compositions of the invention. Its use is independent of the possible interreaction of said materials to form other chemical constituents.

Component A of the compositions of the invention may be a conventional one-part or two-part RTV composition; it is most often a two-part composition. It typically comprises at least one reactive silicone, at least one condensation catalyst and at least one crosslinking agent.

The reactive silicone is most often a polydialkylsiloxane, typically of the formula

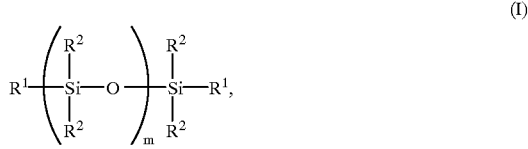

wherein each $R^1$ is hydroxyl or

each $R^2$ is independently a hydrocarbon or fluorinated hydrocarbon radical, each $R^3$ and $R^4$ is a hydrocarbon radical, a is 0 or 1 and m has a value such that the viscosity of said reactive silicone under ambient temperature and pressure conditions is up to about 50,000 centipoise. Illustrative hydrocarbon radicals are $C_{1-20}$ alkyl, $C_{6-20}$ aryl and alkaryl, vinyl, isopropenyl, allyl, butenyl and hexenyl, with $C_{1-4}$ alkyl and especially methyl being preferred. An illustrative fluorinated hydrocarbon radical is 3,3,3-trifluoropropyl. Most often, each $R^2$, $R^3$ and $R^4$ is alkyl and preferably methyl.

It is within the scope of the invention to employ two or more reactive silicones, differing in average molecular weight. This may afford a bimodal composition having performance advantages over a simple monomodal composition.

The condensation catalyst may be any of those known to be useful for promoting condensation curing of an RTV material. Suitable catalysts include tin, zirconium and titanium compounds as illustrated by dibutyltin dilaurate, dibutyltin diacetate, dibutyltin methoxide, dibutyltin bis (acetylacetonate), 1,3-dioxypropanetitanium bis (acetylacetonate), titanium naphthenate tetrabutyl titanate and zirconium octanoate. Various salts of organic acids with such metals as lead, iron, cobalt, manganese, zinc, antimony and bismuth may also be employed, as may non-metallic catalysts such as hexylammonium acetate and benzyltrimethylammonium acetate. For most purposes, the tin and titanium compounds are preferred.

As crosslinking agents, trifunctional (T) and tetrafunctional (Q) silanes are useful, the term "functional" in this context denoting the presence of a silicon-oxygen bond. They include such compounds as methyltrimethoxysilane, methyltriethoxysilane, 2-cyanoethyltrimethoxysilane, methyltriacetoxysilane, tetraethyl silicate and tetra-n-propyl silicate. The Q-functional compounds, i.e., tetraalkyl silicates, are often preferred.

Component A may contain other constituents, including reinforcing and extending (non-reinforcing) fillers. Typical reinforcing fillers are commercially available in the form of relatively large aggregated particles, typically having an average size significantly greater than 300 nm. The preferred fillers are the silica fillers, including fumed silica and precipitated silica. These two forms of silica have surface areas in the ranges of 90–325 and 80–150 m$^2$/g, respectively.

The reinforcing filler is most often pretreated with a treating agent to render it hydrophobic. Typical treating agents include cyclic silicones such as cyclooctamethyltetrasiloxane and acyclic and cyclic organosilazanes such as hexamethyldisilazane, 1,3-divinyl-1,1,3,3-tetramethyldisilazane, hexamethylcyclotrisilazane, octamethylcyclotetrasilazane and mixtures of these. Hexamethyldisilazane is often preferred.

Non-reinforcing fillers include titanium dioxide, lithopone, zinc oxide, zirconium silicate, iron oxides, diatomaceous earth, calcium carbonate, glass fibers or spheres, magnesium oxide, chromic oxide, zirconium oxide, aluminum oxide, crushed quartz, calcined clay, talc, kaolin, asbestos, carbon, graphite, cork, cotton and synthetic fibers.

The proportions of the constituents of component A may be varied widely. The amount of filler is generally about 5–200 parts and preferably about 10–150 parts by weight per 100 parts of reactive silicone. Catalysts and crosslinkers are generally present in the amounts of about 0.001–2.5% and about 0.25–5.0% by weight respectively, based on the combination of reactive silicone and filler.

Component B is a water-insoluble polyorganosiloxane free from silanol groups and containing at least one hydroxy- or alkoxy-terminated polyoxyalkylenealkyl radical. Said radical or radicals comprise about 10–60% by weight of component B; that is, the molecular weight attributable to said radicals is about 10–60% by weight of the total molecular weight attributable to component B.

In general, component B comprises compounds of the formula

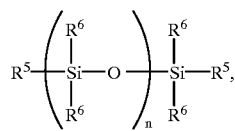

(III)

wherein each $R^5$ is a hydrocarbon radical and each $R^6$ is a hydrocarbon or fluorinated hydrocarbon radical, with the proviso that at least one of the $R^{5-6}$ radicals has the formula

(IV)

wherein $R^7$ and each $R^8$ is independently $C_{2-6}$ alkylene and $R^9$ is hydrogen or $C_{1-4}$ primary or secondary alkyl; n has a value such that the weight average molecular weight of the compound of formula III is in the range of about 500–40,000; and z and the number of radicals of formula IV are such that said radicals of formula IV comprise about 10–60% by weight of component B. The illustrative and preferred hydrocarbon radicals for $R^{5-6}$ are the same as those for $R^{1-2}$. $R^7$ and $R^8$ may be, for example, ethylene, propylene or trimethylene; $R^7$ is preferably trimethylene and $R^8$ is preferably ethylene. $R^9$ is most often hydrogen or methyl.

Illustrative compounds of formula III are available from Gelest, Inc., under the trade designations "DMS-C" and "DBE". One illustration of such a compound is "DMS-C15" which has a molecular weight of 1,000 and a viscosity in the range of 30–50 centipoise and in which each $R^6$ is methyl, each $R^5$ has formula IV, $R^7$ is trimethylene, $R^8$ is ethylene, $R^9$ is hydrogen and the radicals of formula IV constitute about 20% by weight of the molecule. Another is "DBE-224", which has a molecular weight of 10,000 and a viscosity of about 400 centipoise and in which each $R^5$ and each $R^6$ is methyl, with the proviso that enough $R^6$ radicals have formula IV in which $R^7$ is trimethylene, $R^8$ is ethylene and $R^9$ is methyl to provide about 25% by weight of the molecule. More generally, the compounds employed as component B which contain internal radicals of formula IV should contain them in an amount to provide about 20–30% by weight of the molecule.

Component B is present in the compositions of the invention in an effective proportion to enhance foul release properties. For the most part, about 5–20 parts by weight per 100 parts of component A is adequate. The essential property of component B is that of blooming to the surface of the cured product of component A during or after the curing process, by reason of its higher polarity than component A.

The compositions of this invention may also incorporate further onstituents such as non-reactive silicone oils, dyes, solubilizing agents and solvents to render them sprayable if sprayability is desirable. These may be introduced as part of component A or as adjuvants to the entire composition, as appropriate.

Suitable solvents include aromatic hydrocarbons such as toluene or xylene and aliphatic hydrocarbons such as petroleum naphtha. Solubilizing agents include vinyl-substituted silicones, generally present, if at all, in amounts up to about 25% by weight based on the combination of components A and B.

The marine structures in the articles of the invention are often ships' hulls. However, other underwater articles such as liquid collecting and discharge pipes, dry dock equipment and the like are included. Suitable materials therefor include metals such as iron and aluminum and resinous materials such as fiber-reinforced thermoplastic or thermoset resins.

Application of the compositions of the invention is typically preceded by the application of conventional pretreatment layers. These may include, for example, anti-corrosive epoxy primers, mist coats and tie-layers comprising polyorganosiloxanes and toughening components. The compositions of the invention may be applied by conventional techniques such as brushing or drawing down, or by spraying if they are suitably diluted.

The invention is illustrated by the following examples. All parts and percentages are by weight.

EXAMPLE 1

A condensation curable RTV composition was prepared by blending the following constituents in the amounts indicated:

Part I:
  Silanol-stopped polydimethylsiloxane, viscosity 30,000 centipoise—100 parts;
  non-reactive polydimethylsiloxane oil, viscosity 20 centipoise—38.5 parts;
  n-propyl silicate—12.13 parts;
  fumed silica, hexamethyldisilazane-treated—37 parts.
Part II: dibutyltin dilaurate.

The two parts, also containing conventional additives such as non-reinforcing fillers, dyes and compatibilizers, were combined in proportions such that the dibutyltin dilaurate was present in the amount of 2.43 parts per 100 parts of silanol-stopped polydimethylsiloxane. To the resulting RTV composition was added 10% by weight, based on RTV composition, of a polydimethylsiloxane having hydroxy-terminated 3-(polyoxyethylene)propyl end groups and a weight average molecular weight of about 1,000. The composition thus prepared was applied by curtain coating to aluminum test panels which had been previously coated with a commercially available epoxy anti-corrosion coating, mist coat and tie-layer. The test panels were exposed to water for 12 months, after which time the 91–99% of their surface area was unfouled and no encrusting bryozoans were present. A control panel, coated with the RTV composition alone, had 66–69% of its surface area unfouled and had 25–50% encrusting bryozoans.

EXAMPLES 2–3

An RTV composition was prepared by blending (Part I) 70 parts of a silanol-terminated polydimethylsiloxane having a viscosity of 3,100 centipoise, 29 parts of calcium carbonate and 2 parts of tetraethyl silicate, and (Part II) 0.5 part of dibutyltin dilaurate. There were then added 10%, based on RTV composition, of the following Example 2—the hydroxy-termiinated 3-(polyoxyethylene)propyl polydimethylsiloxane of Example 1.

Example 3—a methyl-terminated polydimethylsiloxane containing internal methoxy-terminated 3-(polyoxyethylene)propyl groups and having a weight average molecular weight of 10,000.

Aluminum test panels similar to those of Example 1 were primed with a commercially available primer and then curtain coated with the compositions of Examples 2–3. They were then submerged in a salt water lagoon in Florida in cages until barnacle settlement occurred. At the end of the test period, barnacle adhesion, as determined by ASTM test procedure D5618, for the panels coated with the products of Examples 2 and 3 were 0.69 psi and 5.18 psi, respectively. A control panel coated with the RTV composition only had a barnacle adhesion of 10.35 psi.

What is claimed is:

1. An article comprising a marine structure coated with an anti-fouling coating which is the condensation cured reaction product of a condensation curable coating composition comprising the following and any reaction products thereof:

(A) a one- or two-part room temperature vulcanizable polyorganosiloxane composition, and (B) a marine foul release-enhancing proportion of at least one polyorganosiloxane free from silanol groups and comprising about 10–60% by weight of at least one hydroxy- or alkoxy-terminated polyoxyalkylenealkyl radical, component B being capable of blooming to the surface of the cured product of component A.

2. An article according to claim 1 wherein component A comprises at least one reactive silicone, at least one condensation catalyst and at least one crosslinking agent.

3. An article according to claim 2 wherein component B comprises compounds of the formula

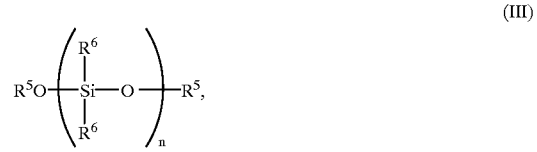

(III)

wherein each $R^5$ is a hydrocarbon radical and each $R^6$ is a hydrocarbon or fluorinated hydrocarbon radical, with the proviso that at least one of the $R^{5-6}$ radicals has the formula

(IV)

wherein $R^7$ and each $R^8$ is independently $C_{2-6}$ alkylene and $R^9$ is hydrogen or $C_{1-4}$ primary or secondary alkyl; n has a value such that the weight average molecular weight of the compound of formula III is in the range of about 500–40,000; and z and the number of radicals of formula IV are such that said radicals of formula IV comprise about 10–60% by weight of component B.

4. An article according to claim 3 wherein component B has a viscosity in the range of 30–50 centipoise and each $R^6$ therein is methyl, each $R^5$ has formula IV, $R^7$ is trimethylene, $R^8$ is ethylene and $R^9$ is hydrogen.

5. An article according to claim 3 wherein component B has a viscosity of about 400 centipoise and each $R^5$ and each $R^6$ is methyl, with the proviso that enough $R^6$ radicals have formula IV in which $R^7$ is trimethylene, $R^8$ is ethylene and $R^9$ is methyl to provide about 20–30% by weight of the molecule.

6. An article comprising a marine structure coated with an anti-fouling coating which is the condensation cured reaction product of a condensation curable coating composition comprising components (A) and (B) and any reaction products thereof:

wherein the first component (A) comprises a one- or two-part room-temperature vulcanizable polyorganosiloxane composition which comprises at least one crosslinking agent wherein the agent comprises tetraalkyl silicate; at leat one condensation catalyst wherein the catalyst comprises a tin, zirconium or titanium compound; and at least one reactive silicone wherein the reactive silicone is a polydialkylsiloxane having the formula

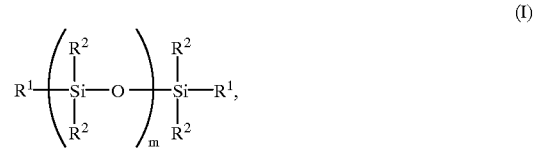

(I)

wherein each $R^2$ is methyl, and each $R^1$ is hydroxyl or

(II)

wherein $R^3$ and $R^4$ is a hydrocarbon radical and a is 0 or 1, and wherein the second component (B) comprises a marine foul release-enhancing proportion which comprises compounds of the formula

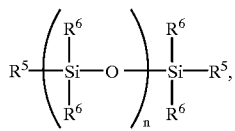
(III)

wherein each $R^5$ has the formula $-R^7-(OR^8)_z-OR^9$, (IV)

wherein each $R^6$ therein is methyl, $R^7$ is trimethylene, $R^8$ is ethylene and $R^9$ is hydrogen; n has a value such that the weight average molecular weight of the compound of formula III is in the range of about 500–40,000; and z and the number of radicals of formula IV are such that said radicals of formula IV comprise about 10% and about 60% by weight of component B.

component B being capable of blooming to the surface of the cured product of component A.

* * * * *